United States Patent [19]

Van Den Mosselaar et al.

[11] Patent Number: 5,335,406
[45] Date of Patent: Aug. 9, 1994

[54] METHOD AND DEVICE FOR DISMANTLING AUTOMOBILES

[75] Inventors: Franciscus L. M. T. Van Den Mosselaar, Dongen; Gerrit J. Termaten, Lochem; Leonardus T. M. Reuser, Ede, all of Netherlands

[73] Assignee: Car Recycling Systems "CRS" B.V., Ede, Netherlands

[21] Appl. No.: 982,681

[22] Filed: Nov. 27, 1992

[30] Foreign Application Priority Data

Nov. 28, 1991 [NL] Netherlands .................. 9101988

[51] Int. Cl.$^5$ .............................................. B23P 19/04
[52] U.S. Cl. .................................. 29/426.3; 29/426.4
[58] Field of Search .................. 29/403.1, 403.3, 430, 29/426.1, 426.3, 426.4, 403.2

[56] References Cited

U.S. PATENT DOCUMENTS

| 1,613,213 | 1/1927 | Wilde et al. |
|---|---|---|
| 4,037,302 | 7/1977 | Hollander ............... 29/403.3 |
| 4,905,363 | 3/1990 | Boyenvel . |

FOREIGN PATENT DOCUMENTS

| 0404038 | 12/1990 | European Pat. Off. . |
|---|---|---|
| 360501 | 9/1988 | Fed. Rep. of Germany . |
| 9004814 | 9/1990 | Fed. Rep. of Germany . |
| 4143251 | 9/1992 | Fed. Rep. of Germany . |

Primary Examiner—Mark Rosenbaum
Assistant Examiner—David P. Bryant
Attorney, Agent, or Firm—Foley & Lardner

[57] ABSTRACT

Method for dismantling automobiles, in which a car (3) to be dismantled is placed on transporting members (5) which are movable over rails (4, 19) to guide the car past successive stations for performing certain activities at each station. A rotating device (20) is employed to bring the car up over a certain distance and for rotating it about one of its shafts, whereby the bottom side of the car is accessible from above. After bringing up the car (3), but before rotating it, one or more receptacles (49) are brought underneath the car for receiving liquid flowing from the car. Working platforms (45) are present at least at the rotating device (20), so that the bottom side of the car is well accessible.

10 Claims, 5 Drawing Sheets

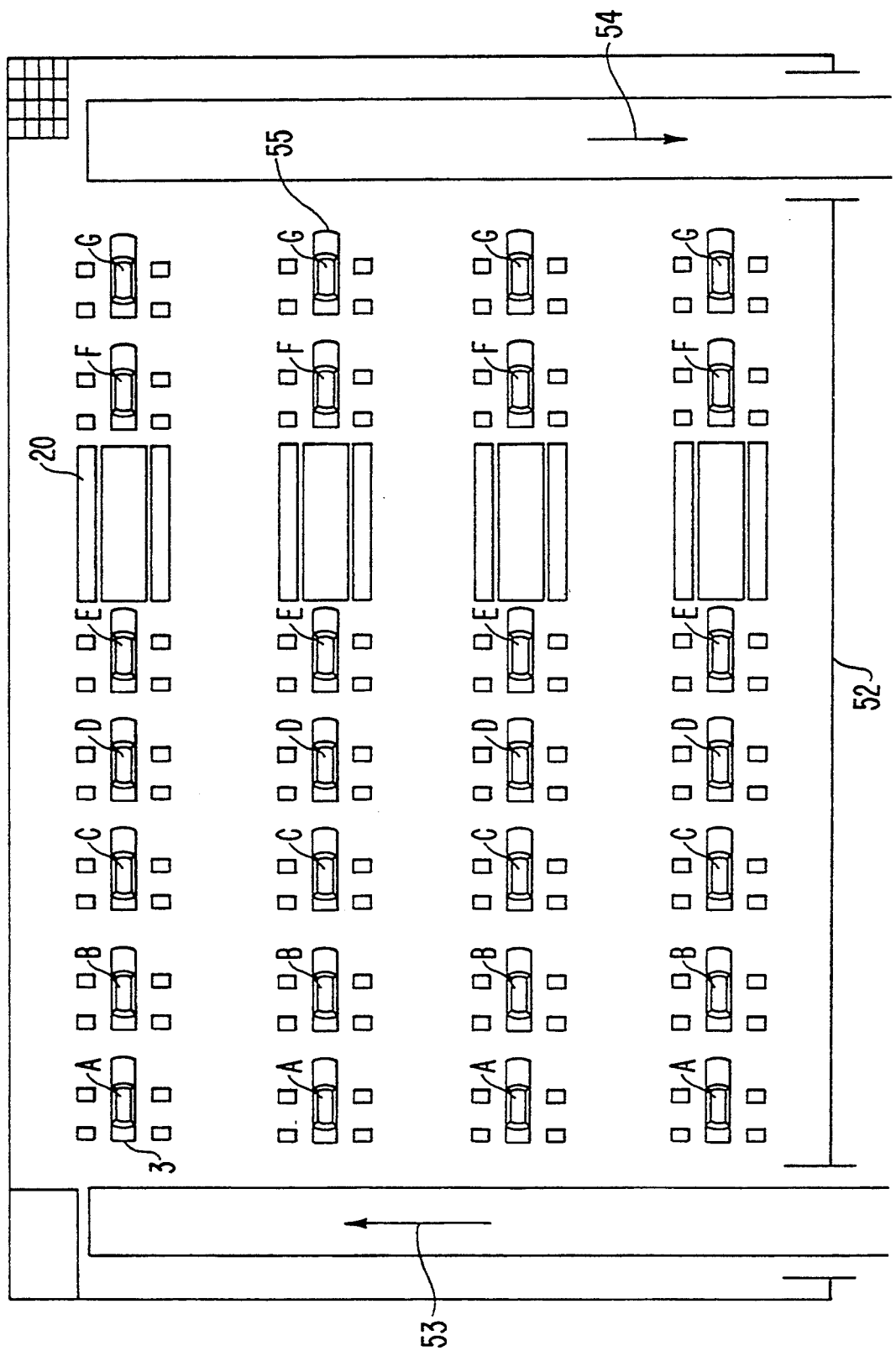

METHOD AND DEVICE FOR DISMANTLING AUTOMOBILES

BACKGROUND OF THE INVENTION

The invention relates to a method and a device for dismantling automobiles.

At present, in dismantling automobiles, in many cases the car to be dismantled is put on a certain location, after which the parts still usable are removed from it. If necessary, one also employs a hoisting device in order to lift the car so that parts can be removed from its bottom side.

Such dismantling activities are very labor intensive and dirty, especially when parts have to be removed from the bottom side of the car. Further, one has to employ hoisting devices and the like for removing heavy parts, like for example the motor with drive shafts. For these hoisting devices and for the removal of detached parts, sufficient room must be available around the car to be dismantled. Therefore, in general only a few cars can be dismantled at the same time.

Further, experience shows that in dismantling automobiles, various liquids can flow away from parts, such as for example brake fluid, motor oil, fuel and the like. Collecting the fluids is not always possible so that the ground of many yards where cars are dismantled gets contaminated.

SUMMARY OF THE INVENTION

The invention corrects the above deficiencies and to that end provides a method which is characterized in that a car to be dismantled is placed on a transporting member which is movable over rails in order to guide the car past a plurality of stations to be stopped at successive stations for performing certain activities at each station. At least one of the stations being provided with a rotating device for lifting the car up over a certain distance and for rotating it about one of its shafts whereby the bottom side of the car is accessible from above, the car has been lifted up, but before rotating it, one or more receptacles are placed underneath the car for collecting liquid running from the car and working platforms are present, at least with the rotating device, in relation to which the car can be brought to the desired height.

In particular, in one embodiment the longitudinal shaft of the car runs parallel to the longitudinal direction of the rails over which the transporting member is movable and the car is rotated about its longitudinal axis at the rotating device.

Since most of the dismantling activities will be performed from the sides of the car, not much space needs to be kept free between two successive cars. The discharge of parts removed from or out of a car can therefore take place in an easy way.

The invention also relates to a device for applying the method described above, which device is characterized in that it comprises transporting members which are movable over rails and serve to support a car to be dismantled at four points, means for returning the transporting members from the end of the dismantling track to its beginning and a rotating device by which a car can be lifted from a transporting member and rotated about its axis between the position where the car is on the transporting member and a position rotated relative thereto. The rotating device comprises receptacles, which after lifting a car up from the transporting member can be brought underneath the car before it is rotated about its axis.

Since the dimensions of the cars to be dismantled can vary, the transporting member can include two pairs of wheels, two supporting girders running substantially parallel to the rails and connecting girders being square to the supporting girders, the connecting girders have supporting members, which can be positioned at variable distances from each other in adjustment to the width of a car to be dismantled and can also be placed at variable distances from each other in the longitudinal direction of the rails depending on the length of the car concerned, by means of the supporting girders running parallel to the rails.

A simple construction can be obtained when the connecting girders are box girders which run obliquely upward from a supporting girder and alongside each other and which are connected to each other at the point where they intersect. A secondary girder is movable and securable at the desired point in each box girder, which girder carries a supporting member at its free end.

In order to support a car in such a way that it takes up a stable position, in their operative position, the supporting members will extend obliquely upwards from the upper surface of the girder concerned.

For returning the transporting members from the end of the transporting track to its beginning, return rails can be provided, which have been mounted underneath the rails over which the transporting members are moved when a car is situated thereon the return rails slightly incline towards the beginning of the transport track, while means have been provided for lifting the transporting members from the return rails up to the operating position and for bringing the transporting members back on the return rails at the end of the transport track.

Through this, the floor surface occupied by the complete device can be limited, since only at the beginning and end of the transport track means are necessary for bringing the transporting members, which only have a limited dimension in the longitudinal direction of the track, up or down.

In order to restrict the distance between the rails, mounted over each other, in the vertical direction as much as possible, the supporting members are rotatably connected to the secondary girders such that they can come to lie on the upper surface of the girders when the transporting members are moved over the return rails.

A simple construction of the rotating device comprises four columns which have been placed two by two at both sides of the rails with a horizontal connecting girder running transverse to the direction of the rails, each of both ends of the girder being supported by a column such that the connecting girders are movable in the vertical direction. A pivot point is mounted in the middle of each connecting girder for a lifting and rotating frame pivotable about a horizontal shaft running parallel to the longitudinal direction of the rails. The frame includes two transverse girders running parallel to each other with transverse girder each being supported near the middle in one of the pivot point the transverse girders are connected to each other by at least one U-shaped connecting girder for receiving a car within this girder and the transverse girders, with clamping girders provided with clamping members being mounted between the opposite ends of the two transverse girders. The clamping girders run parallel to the rails and their ends are movable along the transverse girders such that the clamping girders are moved transverse to their longitudinal direction for clamping a car between them.

The lifting and rotating frame can be brought over a car from above, so that after rotating the frame, the bottom side of the car is heavily accessible.

With that, the clamping members can be releasably connected to the clamping girders, so that they can be adjusted to the dimensions of the car to be accommodated in the lifting and rotating frame.

In order to guide the ends of the clamping girders, the ends of the clamping girder can be connected with a guiding plate provided with wheels, the wheels being guided by the corresponding transverse girder.

Further, in order to move the clamping girders towards and away from each other, one can employ two pressurized fluid operated cylinders situated near the transverse girders, an arm being pivotably connected to each end of a clamping girder, which arm always encloses an acute angle with the transverse girder, each of the arms of opposite ends of the two clamping girders at their other end are pivotably connected to a common sliding block which is movable along a guiding column connected to the middle of the transverse girder situated there and which runs square to the plane in which the transverse girders are situated.

In this way it is achieved, that on bringing the clamping girders towards each other with the help of the pressurized fluid cylinders, they move towards the middle of the transverse girders over equal distances. The longitudinal center plane of a clamped car will thus almost coincide with the longitudinal center plane of the lifting and rotating frame.

Although there is continual mention of a car, it will be obvious that, in particular in the latter case, one can hardly speak of a car, since many of its parts have already been removed.

The invention also relates to a hoisting device for bringing a car to be dismantled onto a transporting member of the device described above. The known hoisting device consists of two pivotably connected grippers which are rotated inwardly through the opened windows. With that, in most cases the body will be damaged, by which opening of the doors afterwards becomes difficult, if not impossible. This can cause problems in dismantling the car with the help of the device described above.

The hoisting device according to the invention comprises a girder provided with hooks being pivotably connected thereto near its ends, with each hook under its pivot point having been connected to a cable or chain and both cables or chains running obliquely towards each other and having been connected directly or indirectly to each other and to a hoisting device, such that on hoisting, the parts of the hooks directed towards each other move towards each other and will come to lie underneath the roof of a car, while the girder will come to rest on the roof.

Therein, the hooks and in particular also their ends can be formed in such a way that there will hardly be any damage to the body of the car.

In order to be able to adjust the device to cars with different widths, it will be particualr be provided for, that the distance between the pivot points of the hooks is variable.

A simple construction is obtained when the pivot point of at least one of the hooks is mounted to a console which has been movably and fixably mounted on the girder.

According to the invention, pressurized fluid operated cylinders can be present for pushing the parts of the hooks directed towards each other apart before these are brought into the car. Through this, operating the device becomes simple and can be done by one person.

Such a device can not only be employed for placing a car onto a transporting member according to the present invention, but onto a truck or the like as well.

BRIEF DESCRIPTION OF THE DRAWINGS

The invention is further explained by way of an embodiment, illustrated in the drawings. In the drawings:

FIG. 13 shows a plan view of a number of devices according to the invention, arranged in one industrial building.

DETAILED DESCRIPTION OF THE PREFERRED EMBODIMENT

Figure 1:
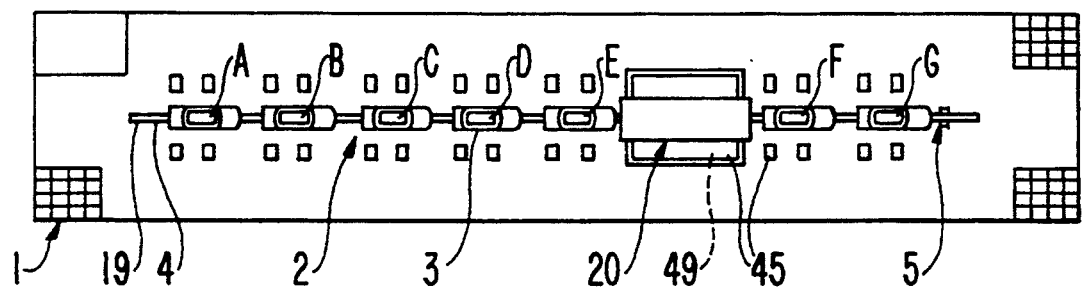
FIG. 1 diagrammatically shows a plan view of a device according to the invention, arranged in an industrial building, with on the device a number of cars to be dismantled and partly dismantled cars.
Figure 2:
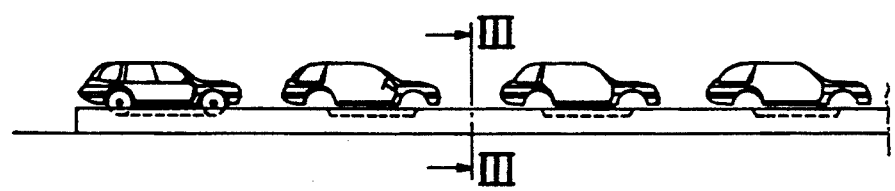
FIG. 2 diagrammatically shows a side view of a part of the device of FIG. 1.
Figure 3:
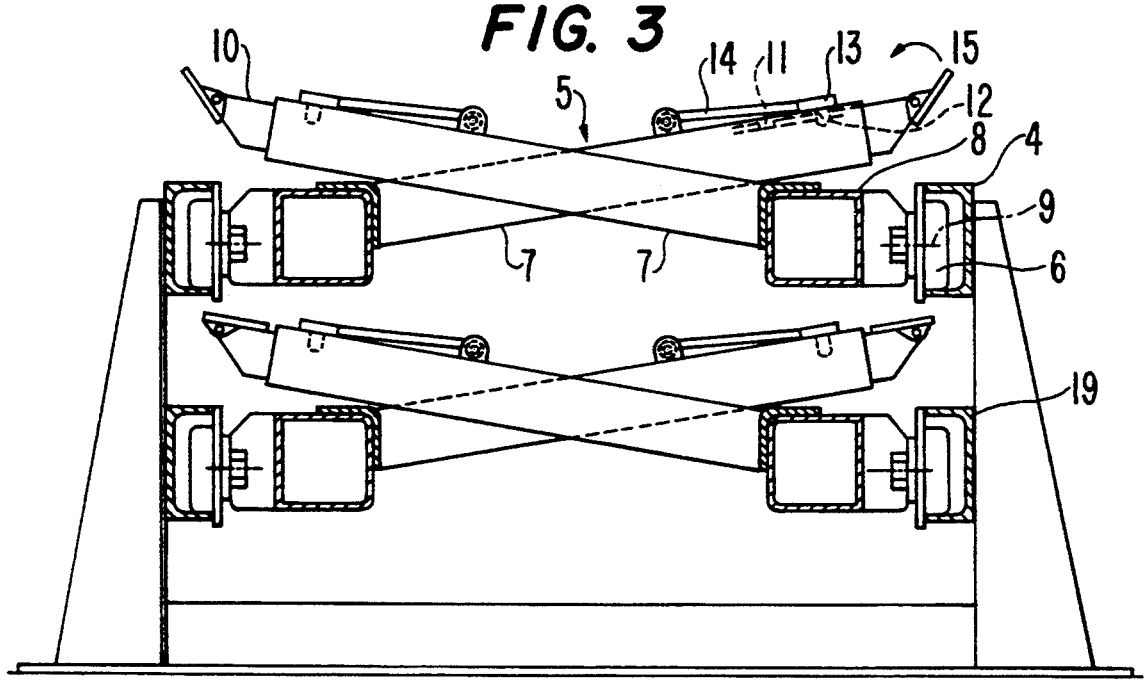
FIG. 3 shows a section across the line III-III of FIG. 2 and particularly of two transporting members and the corresponding rails.
Figure 4:
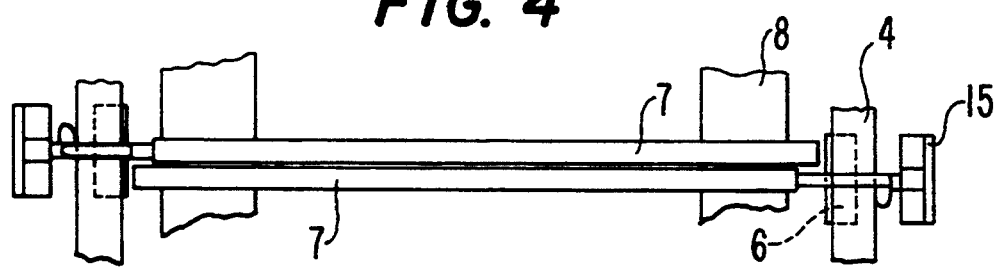
FIG. 4 shows a plan view of some parts shown in FIG. 3.

FIG. 1 shows an industrial building 1, in which a device according to the present invention has been arranged and in which several storage places not further indicated are located, in which materials removed from the cars 3 can be stored.

As appears from the FIGS. 2–8, the device 2 comprises a pair of rails 4, formed by U-beams, for guiding transporting members 5, each of which to that end have been provided with two pairs of wheels 6. The wheels 6 are rotatably mounted on shafts 9 which are directly or indirectly connected to supporting girders 8 which run parallel to the rails 4. The supporting girders 8 are directly or indirectly connected to each other by the connecting girders 7. As appears from FIGS. 3 and 4 the girders 7 extend obliquely upwards from the girders 8 alongside each other and are connected in the point where they intersect. The axes of rotation 9 of the wheels 6 can possibly be indirectly connected with the girders 7 and thus will then be displaced in relation to each other. In this way, a direct transmission of power from the girders 7 to the wheels 6 can take place.

The one set of connecting girders 7 has been fixedly mounted to the supporting girders 8, while the other set of connecting girders 7 of a transporting member 5 has been movably and securably connected with the supporting girders 8 in a way not further indicated. To that end, one can for example employ bushes being movable and securable across the girders 8. Although it has been mentioned, that the shafts 9 have been connected to the girders 8, there is also the possibility that through said bushes being movable across the girders 8 and securable thereon, the shafts 9 of the one set have been connected to the connecting girders 7.

The girders 7 are box girders and a secondary girder 10 has been movably accommodated in each girder. The secondary girder 10 can be secured in the desired position in that a number of bores 11 has been made in this girder. In one of the bores, a pin 12 can be led, which projects through a bore 13 in the girder 7. In order to prevent loss of the pin 12, it can be connected with a strip 14, which in turn has been pivotably connected to the girder 7.

The end of the secondary girder 10 projecting from the girder 7 has been provided with a support member 15. In the upper part of FIG. 3, this support member 15 has been illustrated in the position wherein it can support a car 3. As will be apparent, the support members 15 of a transporting member 5 can be brought at the desired distance from each other in transverse direction by sliding the girders 10 more or less outwards and locking them in the position concerned. Any car 3 can then be supported in an advantageous way in that the supporting members 15 can be positioned at the correct distance from each other also in the longitudinal direction of the rails 4. As already mentioned above, it is possible that to that end the one set of connecting girders 7 has been fixedly connected to the girders 8 and the other set has been movably and securably mounted on these girders. However, both sets can be movably mounted.

Figure 6:
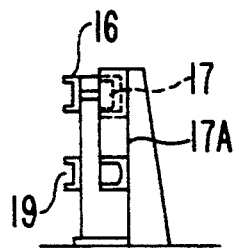
FIG. 6 is an end view of the means of FIG. 5.
Figure 5:
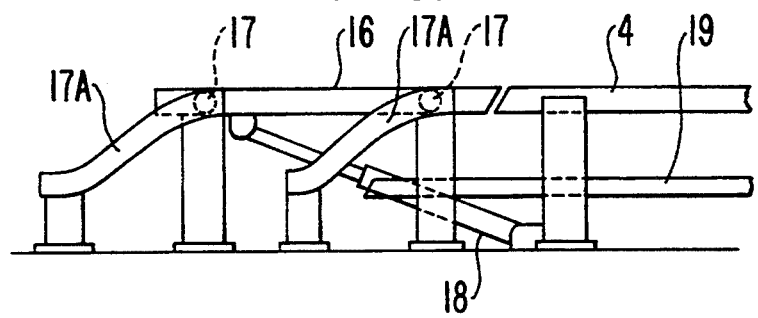
FIG. 5 shows a side view of the means for returning the transporting members to their original positions.

When a car 3 has reached the end of the dismantling device, it is removed from the transporting member 5 and then this transporting member 5 is brought onto a rail portion 16, see FIGS. 5 and 6, which can be lowered in that it is supported by rollers 17 mounted at the outer side, which are situated in bent rail portions 17A. With the help of the pressurized fluid cylinder 18, the portion 16 can be moved downwardly from the position shown in FIG. 5 into a position, in which the rails of the rail, portion 16 connect to the rails 19 lying at a lower layer than rails 4. In this way, a transporting member 5 can be brought at the level of rails 19 such that the transporting member can be returned to the initial point of the dismantling device. To that end, however, first the secondary girders 10 have to be completely shoved into the girders 7 and the supporting members 15 will be rotated to the position shown in FIG. 3, at which they are lying on the girders 10. Through this, a transport member 5 not in use will take up little space and the distance between two rails 4 and between two rails 19 can be kept as small as possible, and the rails 4 and 19 can be positioned close to each other as seen in the vertical direction.

At the starting point of the dismantling device 2, a device is located which corresponds to that shown in FIGS. 5 and 6 by which a transporting member 5 is brought back on the rails 4 from the lower rails 19.

Figure 7:
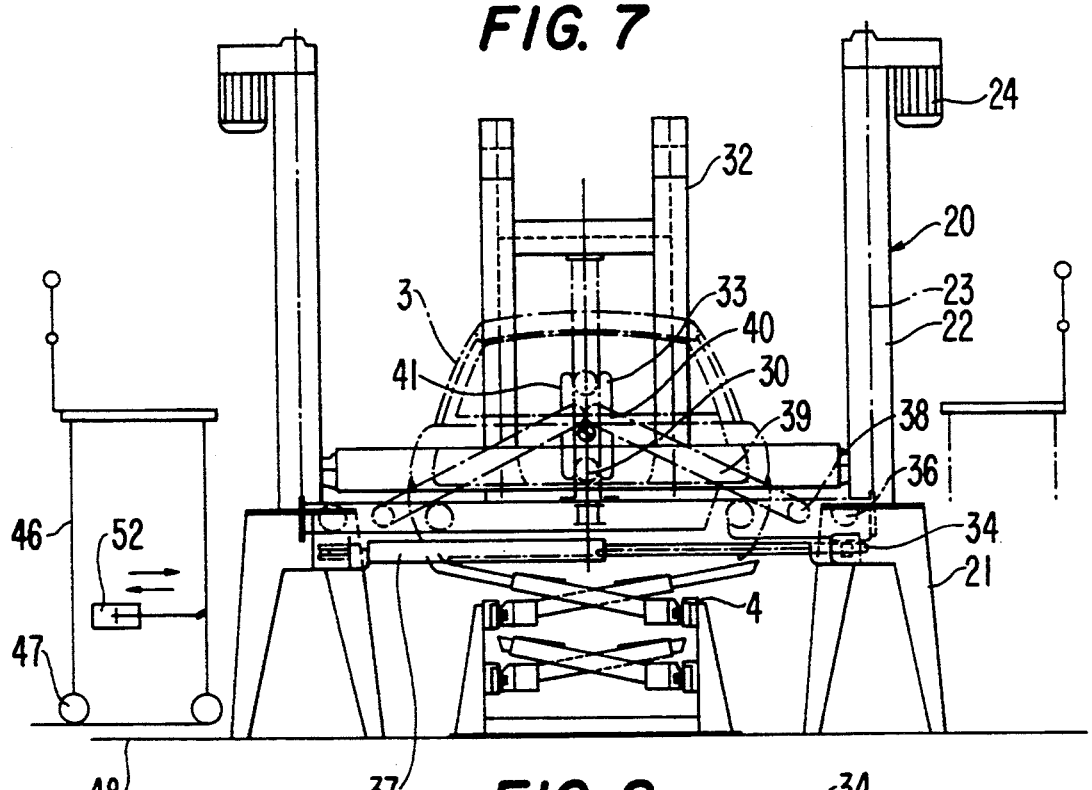
FIG. 7 diagrammatically shows an end view of the rotating device in which a car indicated with dash lines has been accommodated and is still situated on a transporting member.
Figure 8:
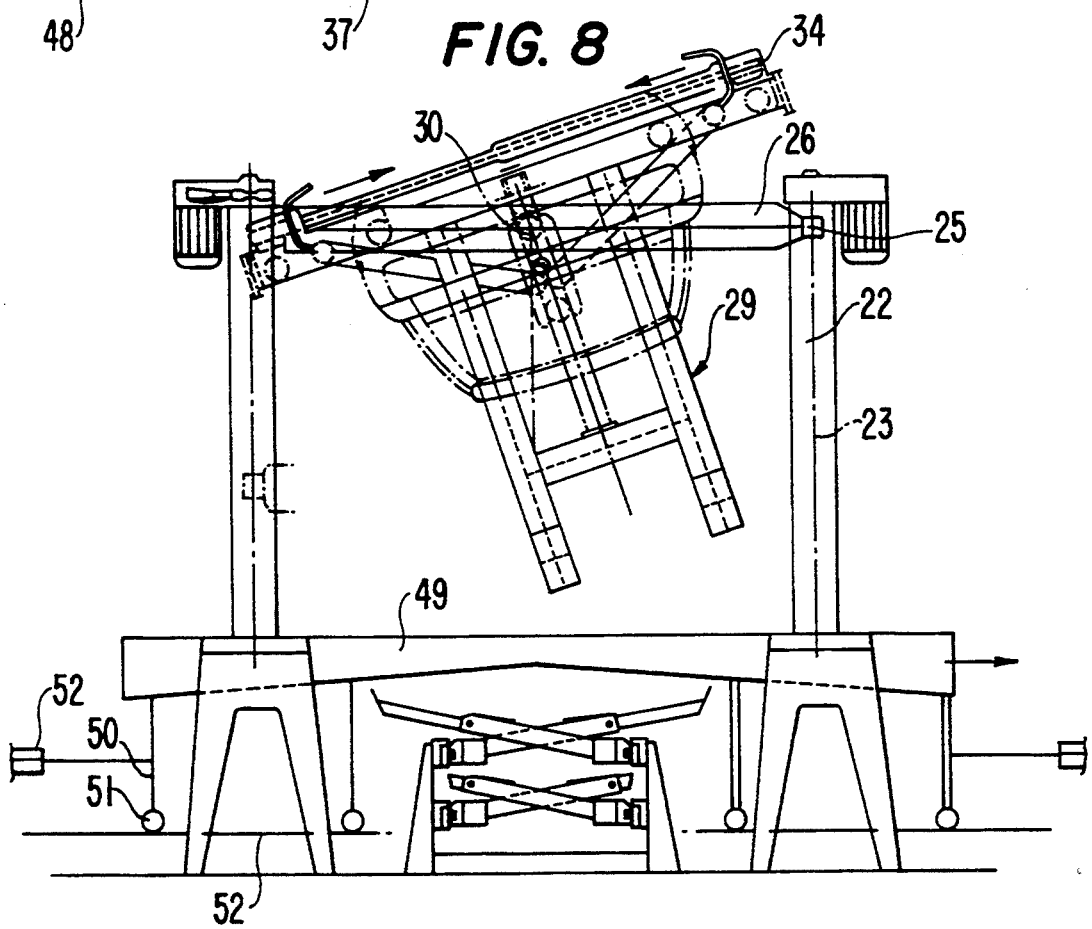
FIG. 8 shows the end view corresponding to FIG. 7, but with the car in the lifted up and rotated position.

The rails 4 and 19 extend underneath the rotating device 20 at a certain location, as appears in particular from the FIGS. 7 and 8.

The rotating device 20 comprises four support blocks 21 having columns 22 mounted thereon, each having been provided with a vertically extending spindle 23 being driven by means of an electric motor 24. On each spindle 23 there is a nut 25 which has been connected with an end of a connecting girder 26. The two connecting girders 26 are square to the longitudinal direction of the rails 4 and have been provided with a console 27 in the middle, see also FIG. 9, which carries a pivot point 28 for the lifting and rotating frame 29. At one of the pivot points 28, a not further indicated motor drive has been mounted, such that the frame 29 can be pivoted about the horizontal shaft 30.

Figure 10:
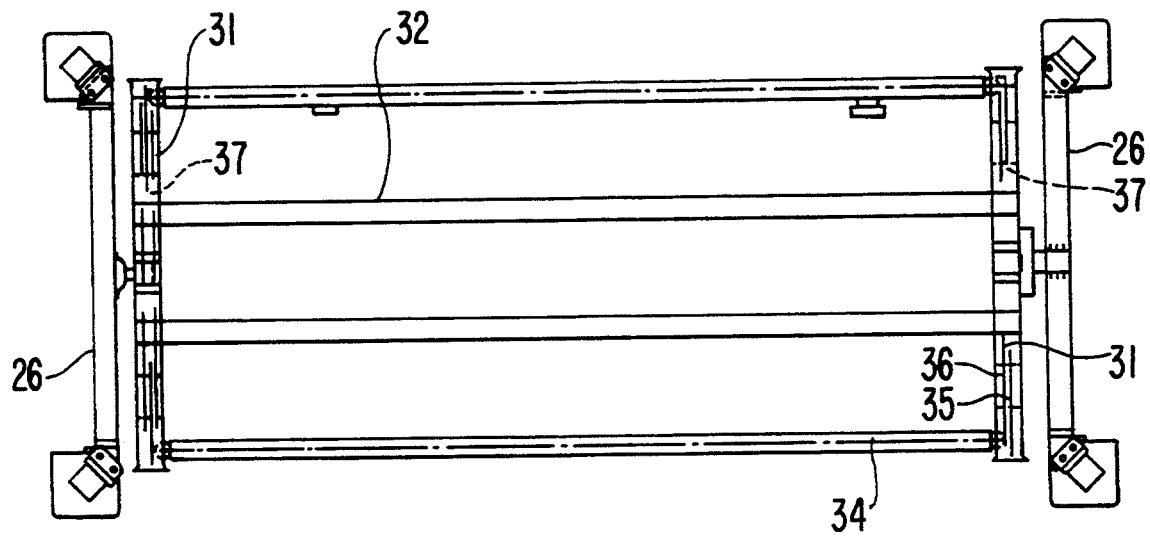
FIG. 10 shows a plan view of the rotating device.

The frame 29 comprises the transverse girders 31, which have been connected to each other by two U-shaped connecting girders 32, see also FIG. 10. In the middle of each girder 26, a guiding column 33 has been mounted square thereto, which cooperates with the pivot point 28, so that the frame 29 can be rotated about the shaft 30, after first having been brought upwards to the position as shown in FIG. 8, with the help of the motors 24.

For accommodating a car 3 in the frame 29, two clamping girders 34 being square to the transverse girders have been mounted between the transverse girders 31. Each end of a clamping girder 34 has been connected to a guiding plate 35 carrying rollers 36, which have been accommodated in the transverse girders 31. Two pressurized fluid cylinders 37 situated near the transverse girders 31 serve to bring the clamping girders 34 towards each other.

In order to move the clamping girders 34 to the middle of the frame 29 over equal distances, the plates 35 of the opposite ends of the two clamping girders 34 have been pivotably connected with an arm 39 in the point 38. The other ends of two arms 39 lying in the same plane have been pivotably connected with a common sliding block 41 in the point 40, which block is movable along the guiding column 33.

Figure 11:
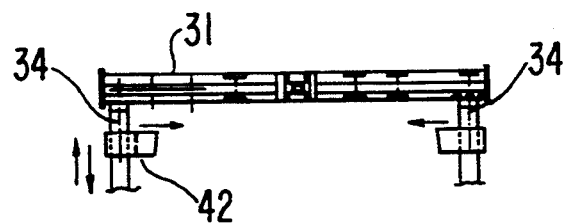
FIG. 11 shows a plan view of a transverse girder of the lifting and rotating frame with the extreme ends of the clamping girders.
Figure 12:
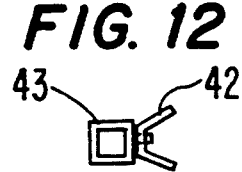
FIG. 12 shows a side view of a clamping member mounted on a clamping girder.

By operating the cylinders 37, the clamping girders 34 can be brought towards each other for clamping a car 3 therebetween. To that end, the clamping girders 34 have been provided with clamping members 42, which are in particular illustrated in FIGS. 11 and 12. Each clamping member 42 has been releasably mounted on a bush 43, which is movable along the clamping girder 34 and can be secured thereon. In this way, clamping members 42 can be used, the shape of which has been adapted to the car to be treated. The clamping members 42 can also be mounted on the clamping girders in the most favorable location.

Figure 9:
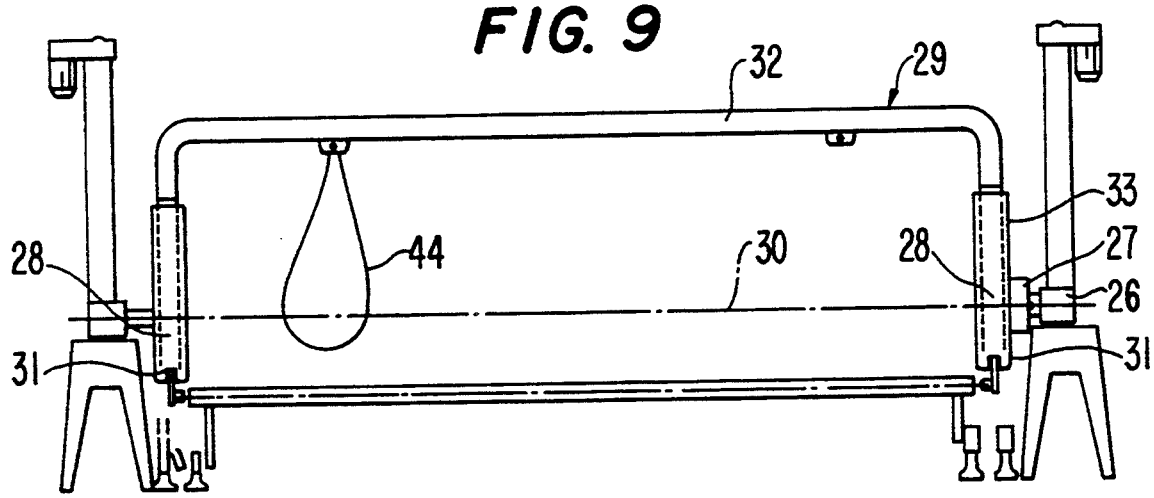
FIG. 9 shows a side view of the rotating device.

As appears from FIG. 9, cables 44 or the like can be fastened to the connecting girders 32, for securing certain parts which are released from a car 3.

From FIG. 1 it appears that working platforms 45 can be placed next to the cars 3 to be dismantled, so that persons working have a best possible access to certain parts of the car. The working platforms 45 can be movable. Further, such working platforms 45 can also be situated next to the rotating device 20, as appears from FIGS. 7 and 8. The working platforms next to the rotating device 20 will obviously be at a greater height than the other working platforms and for example be accessible by means of a staircase. In particular, these working platforms will be supported by legs 46 provided with wheels 47, which can run over rails 48 extending in a direction square to the rails 4.

Between the legs 46, there are receptacles 49 provided with legs 50 with wheels 51, running over rails 52. As appears from FIG. 8, after lifting up the frame 29 the receptacles 49 can be moved under the frame 29 until they engage each other. After that, the frame together with the car 3 being present therein can be rotated such as for example to the position illustrated in FIG. 8. Any liquids flowing from the car and small parts falling from the car on this rotation are received in the receptacles 49.

For moving the working platforms 45 and the receptacles 49, one could for example employ pressurized fluid cylinders 52, which have only been indicated diagrammatically in FIGS. 7 and 8.

Further, there is the possibility of mounting non-illustrated plates in the shape of a gutter directly underneath the rails 4, for receiving liquids and parts coming from a car to be dismantled. Such plates can possibly be connected with the transporting means 5.

FIG. 13 shows the possibility of arranging a number of dismantling devices according to the present invention in a single industrial builing. The arrow 53 indicates the direction in which the cars to be dismantled 3 can be supplied and the arrow 54 indicates the direction in which the frames 55 stripped of parts can be discharged. At each of the stations A-G, certain parts of the supplied cars are removed, while in the rotating device 20 one substantially only disconnects parts. It will be obvious, that in arranging a number of devices in a single industrial building, one can employ common facilities for supply of cars to be dismantled, for the discharge of parts and the like.

Figure 14:
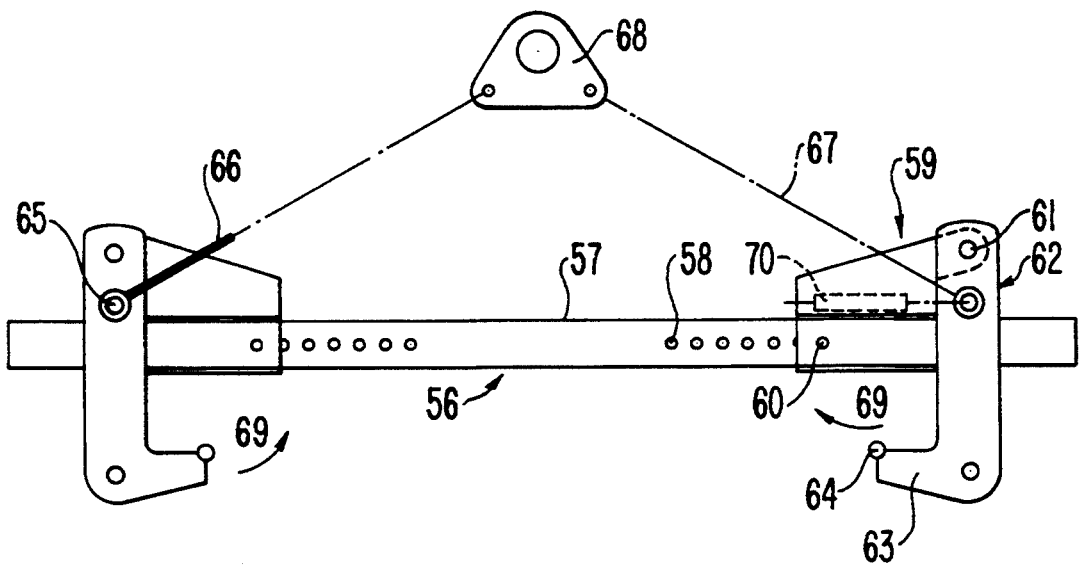
FIG. 14 shows a side view of a hoisting device for bringing a car to be dismantled onto a transporting member of the device shown in FIG. 3.
Figure 15:
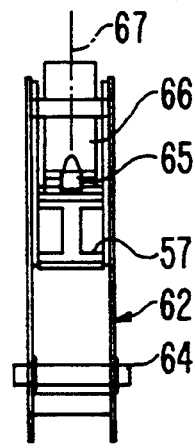
FIG. 15 shows an end view of the device of FIG. 14.

FIGS. 14 and 15 respectively show a side view and an end view of a hoisting device 56 for bringing a car to be dismantled onto a transporting member 5.

The device 56 comprises a girder 57 with bores 58 therein. Two consoles 59 are movable across the girder 57, both having been provided with bores 60 so that they can be secured onto the girder 57 by pins not further indicated, going through the bores 58 and 60.

By means of a pin 61 a hook 62 has been rotatably connected to a console 59. The hooks 62 comprise the parts 63 directed towards each other, at their ends having been provided with bars 64, which contact the car to be lifted and in doing so will hardly damage the car.

Each hook also comprises a pin 65 on which a strip 66 has been rotatably mounted. At its free end, the strip 66 has been connected to a cable or chain 67 and both chains 67 come together at a hoisting lug 68 which can be connecting to a hoisting device. This hoisting device can be rolling in a not further indicated way and for example also be a truck.

Since the pins 65 are situated under the pivot pins 61, on tensioning the chains 67, the hooks will be rotated in the direction of the arrows 69, so that their portions 63 directed towards each other will move towards each other and into the car and to its roof, so that the outside of the roof will come to lie against the girder 57. In this way, one obtains a stable support of the car to be lifted.

In order to rotate the hooks in the opposite direction again after putting down the car, air-operated or hydraulic cylinders 70 have been provided, which at one side have been connected to the console 59 and at the other side to the pin 65, which is part of the hook 62. After operating the cylinders, the hooks are free of the car and the device can be used again.

It will be obvious, that only one possible embodiment of the device according to the invention has been illustrated in the drawing and described above and that many modifications can be made without falling beyond the inventive idea.

We claim:

1. A method of dismantling an automobile comprising the steps of:
    A) placing the automobile on a transporting member disposed on rails so that a bottom side of the automobile faces the transporting member;
    B) moving the transporting member with the automobile thereon over the rails and past a plurality of disassembly stations, one of the disassembly stations including a rotating device;
    C) stopping the transporting member with the automobile thereon at selected ones of the disassembly stations;
    D) disassembling parts of the automobile at the selected ones of the disassembly stations;
    E) stopping the transporting member with the automobile thereon at the rotating device and utilizing the rotating device to lift the automobile off of the transporting member; and
    F) rotating the lifted automobile with the rotating device so that the bottom side of the automobile faces approximately directly opposite from the transporting member whereby the bottom side of the automobile is accessible from above.

2. A method as recited in claim 1, further comprising subsequent to step E) and prior to step F) positioning at least one receptacle below the lifted automobile, and collecting liquid running from the automobile in the at least one receptacle.

3. A method as recited in claim 2, further comprising placing a work platform adjacent to the rotating device such that a person situated on the work platform has access to the bottom side of the automobile from above the automobile after steps E) and F) have been completed.

4. A method as recited in claim 1, wherein step B) includes moving the transporting member in a direction of a longitudinal axis of the automobile and a longitudinal direction of the rails, and step F) includes rotating the automobile about its longitudinal axis.

5. A method as recited in claim 1, wherein during step A) the automobile is placed on the transporting member such that the automobile is freely moveable relative to the rails.

6. A method of dismantling an automobile comprising the steps of:
    A) placing the automobile on a transporting member disposed on rails so that a bottom side of the automobile faces the transporting member;
    B) moving the transporting member with the automobile thereon over the rails and past a plurality of disassembly stations, one of the disassembly stations including a rotating device;
    C) stopping the transporting member with the automobile thereon at selected ones of the disassembly stations;

D) disassembling parts of the automobile at the selected ones of the disassembly stations;

E) stopping the transporting member with the automobile thereon at the rotating device and utilizing the rotating device to lift the automobile off of the transporting member;

F) rotating the lifted automobile with the rotating device so that the bottom side of the automobile faces approximately directly opposite from the transporting member such that the bottom side of the automobile is accessible from above;

G) providing return rails and a first transitioning mechanism for transitioning the transporting member from the rails to the return rails;

H) after steps A) through F) removing the automobile from the transporting member;

I) subsequent to step H) moving the transporting member onto said transitioning mechanism at a first position adjacent the rails;

J) subsequent to step I) moving the first transitioning mechanism having the transporting member thereon to a second position adjacent the return rails;

K) subsequent to step J) moving the transporting member from the first transitioning mechanism onto the return rails; and then L) moving the transporting member over the return rails to a loading position where the transporting member is available for subsequent placing on the rails.

7. A method as recited in claim 6, wherein after step L) the transporting member is moved from the loading position onto the rails and steps A) through L) are repeated.

8. A method as recited in claim 7, further comprising providing a second transitioning mechanism which is moveable between a first location adjacent the return rails at the loading position and a second location adjacent the rails, moving the transporting member onto the second transitioning mechanism while in the first location, then moving the second transitioning mechanism to the second location, and then moving the transporting member onto the rails.

9. A method as recited in claim 8, wherein the first and second transitioning mechanisms each include a first rail portion, a bent rail portion and rollers connected to the first rail portion and movable along the bent rail portion, and the moving of the first transitioning mechanism between the first and second positions and the moving of the second transitioning mechanism between the first and second locations is accomplished by moving the respective first rail portion along the respective bent rail portion via the respective rollers.

10. A method as recited in claim 9, wherein the first rail portions of the first and second transitioning mechanisms are each connected to a pressurized fluid cylinder and the moving of the respective first rail portions of the first and second transitioning mechanisms along the respective bent rail portions is accomplished by expanding and contracting the pressurized fluid cylinder.

* * * * *